US012723938B2

(12) United States Patent
Moslehi et al.

(10) Patent No.: US 12,723,938 B2
(45) Date of Patent: Sep. 1, 2026

(54) DUAL CAVITY INTERFEROMETER SENSOR SYSTEM

(71) Applicant: Intelligent Fiber Optic Systems Corporation, Fremont, CA (US)

(72) Inventors: Behzad Moslehi, Los Altos, CA (US); William Price, Palo Alto, CA (US); Bijan Moslehi, Mountain View, CA (US); Jesse Off, San Jose, CA (US); Keo Sourichanh, San Jose, CA (US); Yo-Yuan Cheng, San Jose, CA (US); Shiva Upadhye, Irvine, CA (US); Vahid Sotoudeh, Los Altos, CA (US)

(73) Assignee: Intelligent Fiber Optic Systems Corporation, Fremont, CA (US)

( * ) Notice: Subject to any disclaimer, the term of this patent is extended or adjusted under 35 U.S.C. 154(b) by 967 days.

(21) Appl. No.: 17/728,957

(22) Filed: Apr. 25, 2022

(65) Prior Publication Data

US 2025/0224295 A1 Jul. 10, 2025

Related U.S. Application Data

(60) Provisional application No. 63/179,061, filed on Apr. 23, 2021.

(51) Int. Cl.
*G01L 11/02* (2006.01)
*G01L 9/00* (2006.01)

(52) U.S. Cl.
CPC .......... *G01L 11/025* (2013.01); *G01L 9/0079* (2013.01)

(58) Field of Classification Search
CPC ...... G01L 11/02; G01L 9/0077; G01L 11/025; G01L 9/0076; G01L 9/0079;
(Continued)

(56) References Cited

U.S. PATENT DOCUMENTS 6,281,976 B1 * 8/2001 Taylor .................. G01P 15/093 356/480
11,846,553 B2 * 12/2023 Sotoudeh ............... G01L 1/246
(Continued)

FOREIGN PATENT DOCUMENTS

CN 115950578 A * 4/2023
DE 102019132522 A1 * 6/2021

*Primary Examiner* — Andre J Allen
(74) *Attorney, Agent, or Firm* — John Ryan C. Wood; Wood Patent Law

(57) ABSTRACT

A fiber-optic apparatus has a multi-mirror optical sensor having an optical source side and an air source side opposite the light source side. The multi-mirror optical sensor has a single-mode optical fiber connected to an optical source and a photodetector on the optical source side and connected to a hollow tube forming a first Fabry-Perot Interferometer on the air source side. The core of the single-mode optical fiber and the air cavity of the first Fabry-Perot Interferometer form a first mirror for reflecting optical light from the optical source. The air source side of the hollow tube is connected to a side-hole optical fiber forming a second Fabry-Perot Interferometer, the side-hole optical fiber has at least two hollow cavity holes symmetrically positioned around the core of the side-hole optical fiber and running longitudinally the length of the side-hole optical fiber. The air cavity of the first Fabry-Perot Interferometer to the optical fiber core of the side-hole optical fiber forms a second mirror for reflecting optical light from the optical source. The at least two hollow cavity holes of the side-hole optical fiber provide an air flow channel to the air cavity of the hollow tube from the air source side of the multi-mirror optical sensor. The end of the optical fiber core of the side-hole optical fiber at the air source side forms a third mirror for reflecting optical light from the optical source.

26 Claims, 16 Drawing Sheets

(58) Field of Classification Search
CPC ..... G01L 9/0007; G01L 9/0039; G01L 23/16; G01L 9/0032; G01L 19/12; G01L 1/24; G01L 19/04; G01L 1/241; G01L 1/246; G01L 9/002; G01L 9/0097; G01L 9/0072; G01L 1/243; G01L 1/245; G01L 19/0092; G01L 9/0088; G01L 11/004; G01L 11/008; G01L 19/08; G01L 7/18; G01L 9/0073; G01L 9/0075; G01L 9/0089; G01L 9/008; G01L 7/086; G01L 9/0022; G01L 19/0645; G01L 27/002; G01L 9/0001; G01L 1/044; G01L 11/00; G01L 19/083; G01L 19/086; G01L 19/14; G01L 19/148; G01L 21/00; G01L 9/0014; G01L 9/0042; G01L 9/0052; G01L 13/00; G01L 19/0084; G01L 19/0618; G01L 23/221; G01L 7/065; G01L 9/0023; G01L 1/02; G01L 1/247; G01L 19/0007; G01L 19/003; G01L 19/0627; G01L 19/0681; G01L 19/147; G01L 23/22; G01L 27/005; G01L 5/228; G01L 9/0011; G01L 9/0026; G01L 9/0041; G01L 9/0051; G01L 9/14; G01L 1/142; G01L 1/148; G01L 1/16; G01L 1/18; G01L 11/04; G01L 13/02; G01L 13/023; G01L 15/00; G01L 17/00; G01L 19/142; G01L 19/143; G01L 7/045; G01L 9/0019; G01L 9/0033; G01L 9/08; G01L 9/085; G01L 1/103; G01L 1/186; G01L 1/242; G01L 11/006; G01L 13/021; G01L 13/025; G01L 13/026; G01L 19/0015; G01L 19/0061; G01L 19/02; G01L 19/069; G01L 19/10; G01L 21/16; G01L 23/08; G01L 23/24; G01L 5/14; G01L 7/04; G01L 7/041; G01L 7/043; G01L 9/0002; G01L 9/0005; G01L 9/0013; G01L 9/0044; G01L 9/0047; G01L 9/0055; G01L 9/006; G01L 9/007; G01L 9/0082; G01L 9/0085; G01L 9/0086; G01L 9/06; G01L 9/12; G01L 13/04; G01L 19/0023; G01L 19/06; G01L 19/0672; G01L 23/10; G01L 23/18; G01L 27/007; G01L 7/026; G01L 7/187; G01L 7/20; G01L 9/0008; G01L 9/0025; G01L 9/0029; G01L 9/0054; G01L 9/0083; G01L 9/0092
USPC ........................................................... 73/705
See application file for complete search history.

(56) References Cited

U.S. PATENT DOCUMENTS 11,898,919 B2 * 2/2024 Sotoudeh ............ G01L 19/0092
2008/0159687 A1 * 7/2008 Donlagic .............. G01P 15/093
385/13

* cited by examiner

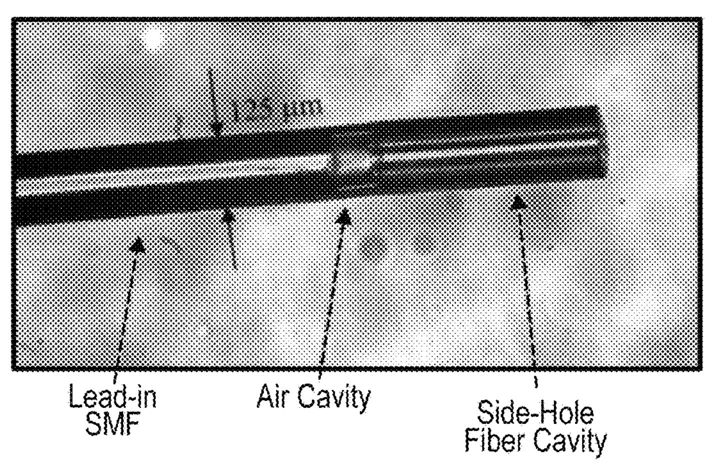
FIG. 2
FIG. 3
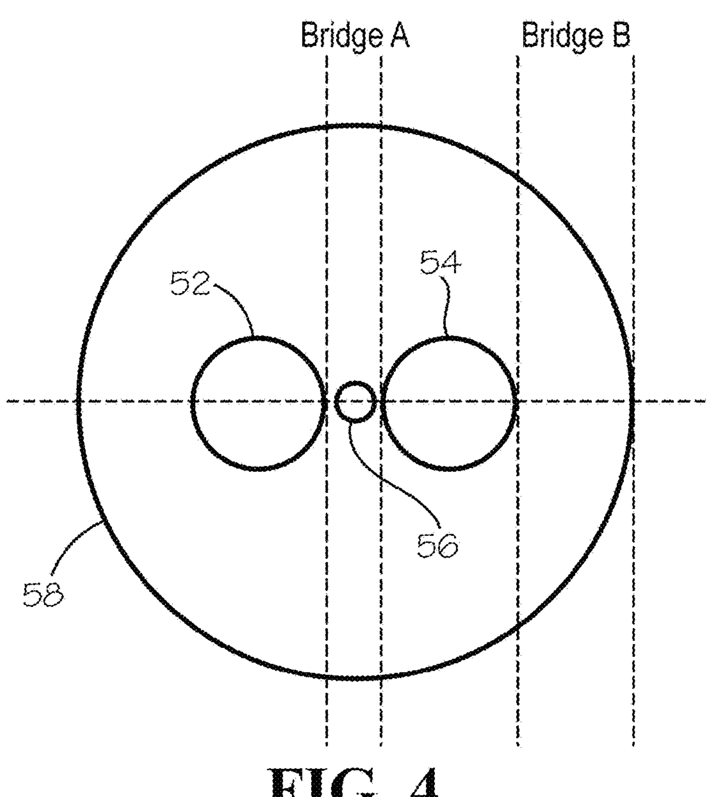
FIG. 4

DUAL CAVITY INTERFEROMETER SENSOR SYSTEM

CROSS-REFERENCE TO RELATED APPLICATIONS

This application claims the benefit of U.S. Provisional Patent Application Ser. No. 63/179,061 filed Apr. 23, 2021, which is hereby incorporated by reference in its entirety.

This invention was made under Air Force STTR contract #FA8650-18-C-2217. The government has certain rights in this invention.

FIELD

This disclosure relates generally to the design and manufacture of fiber optic sensors and systems. More specifically, this disclosure is related to the design and manufacture of fiber optic sensors and systems with multi-mirror dual cavity Fabry-Perot Interferometer based sensor systems for the simultaneous temperature and pressure measurement.

BACKGROUND

The present application is directed towards fiber optic sensors and systems.

SUMMARY

According to one aspect of the disclosed subject matter, a fiber optic sensor system is provided. A fiber-optic apparatus has a multi-mirror optical sensor having an optical source side and an air source side opposite the light source side. The multi-mirror optical sensor has a single-mode optical fiber connected to an optical source and a photodetector on the optical source side and connected to a hollow tube forming a first Fabry-Perot Interferometer on the air source side. The core of the single-mode optical fiber and the air cavity of the first Fabry-Perot Interferometer form a first mirror for reflecting optical light from the optical source. The air source side of the hollow tube is connected to a side-hole optical fiber forming a second Fabry-Perot Interferometer, the side-hole optical fiber has at least two hollow cavity holes symmetrically positioned around the core of the side-hole optical fiber and running longitudinally the length of the side-hole optical fiber. The air cavity of the first Fabry-Perot Interferometer to the optical fiber core of the side-hole optical fiber forms a second mirror for reflecting optical light from the optical source. The at least two hollow cavity holes of the side-hole optical fiber provide an air flow channel to the air cavity of the hollow tube from the air source side of the multi-mirror optical sensor. The end of the optical fiber core of the side-hole optical fiber at the air source side forms a third mirror for reflecting optical light from the optical source.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims.

BRIEF DESCRIPTION OF THE FIGURES

The features, natures, and advantages of the disclosed subject matter may become more apparent from the detailed description set forth below when taken in conjunction with the drawings in which like reference numerals indicate like features.

FIG. 2 is a side-view micrograph of a fiber optic sensor.

FIG. 3 is an end-view cross-sectional micrograph of a side-hole fiber and side-hole fiber cavities.

FIG. 4 is an end-view cross-sectional diagram of a side-hole fiber and side-hole fiber cavities.

DESCRIPTION

Figure 1A:
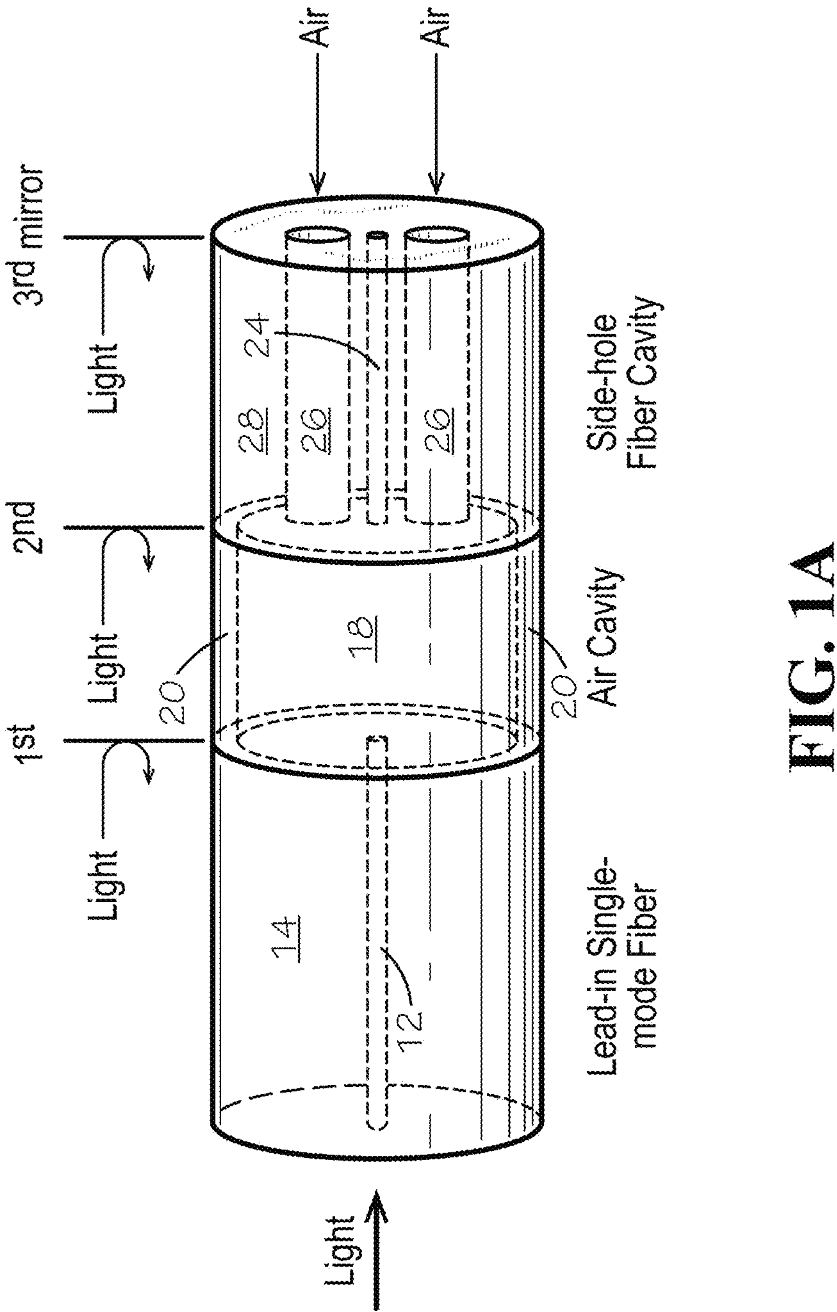
FIG. 1A is a transparent side-view diagram of a fiber optic sensor showing internal aspects and FIG. 1B is a cross-sectional side-view diagram of the fiber optic sensor of FIG. 1A.

The following description is not to be taken in a limiting sense, but is made for the purpose of describing the general principles of the present disclosure. The scope of the present disclosure should be determined with reference to the claims. Exemplary embodiments of the present disclosure may be illustrated in the drawings, like numbers being used to refer to like and corresponding parts of the various drawings. The dimensions of drawings provided are not shown to scale.

The present application provides a fiber optic sensor system for the accurate and efficient capture of pressure and temperature information from reflected light using a dual cavity Fabry-Perot Interferometer (FPI) sensor having three silica-air or air-silica interface "micro" mirrors. The innovative solutions described and provided herein have at least two cascaded Fabry-Perot Interferometers (FPIs), implemented by single-mode optical fibers (SMFs), to sense temperature and pressure in the optical domain simultaneously. The use of these optical fibers provides a simplified, compact, and reliable structure.

In the described multi-mirror sensor design structure, an optical source side single-mode optical fiber (i.e., a "lead-in" single-mode fiber) is connected to a cascaded dual cavity Fabry-Perot Interferometer such that air may flow from an air source end opposite the light source end of the lead-in single-mode fiber through open air channels (or through-holes) in a side-hole fiber second Fabry-Perot Interferometer to an air cavity in a first Fabry-Perot Interferometer. In contrast, light flows from the optical light source through the core of the lead-in single-mode fiber (e.g., a core made of silica) to the air cavity in a first Fabry-Perot Interferometer to the core of the side-hole fiber (e.g., a core made of silica) second Fabry-Perot Interferometer. Three silica-to-air or air-to-silica interface "micro" mirrors at the lead-in single-mode fiber core to first Fabry-Perot Interferometer air cavity (1st mirror), at first Fabry-Perot Interferometer air cavity to side-hole fiber core (2nd mirror), and at the side-hole fiber core to side-hole fiber core end (3rd mirror) reflect light back through the fiber cores to a photodetector connected to the lead-in single-mode fiber for signal processing.

Figure 1B:
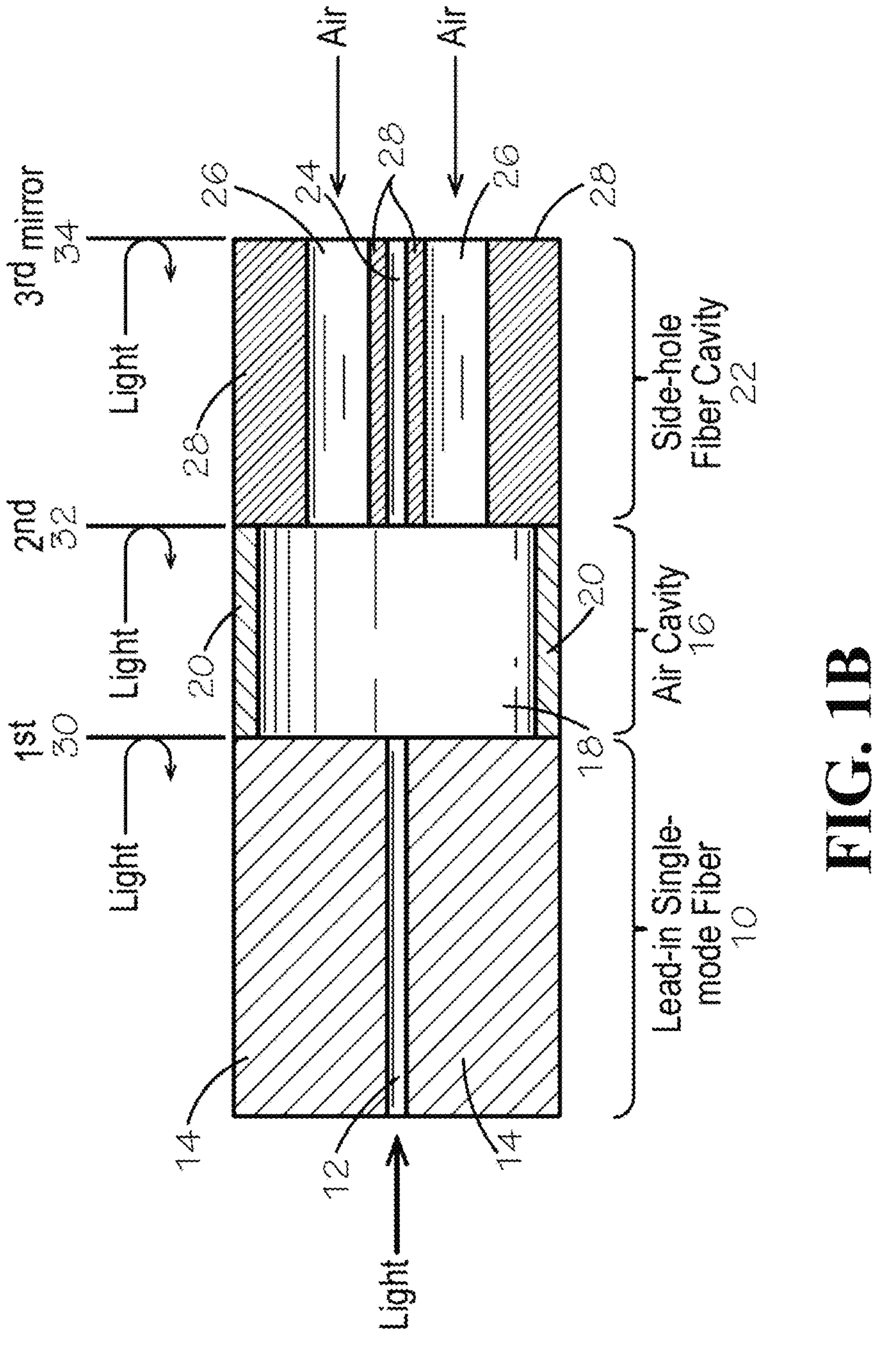

FIGS. 1A and 1B show a multi-mirror dual cavity Fabry-Perot Interferometer based sensor system in accordance with the disclosed subject matter. FIG. 1A is a transparent side-view diagram of a fiber optic sensor showing internal aspects and FIG. 1B is a cross-sectional side-view diagram of the fiber optic sensor of FIG. 1A. A first Fabry-Perot Interferometer 16 with a small volume air cavity is sandwiched between two optical fibers, lead-in single mode fiber 10 and side-hole fiber 22. Fabry-Perot Interferometer 16 with air cavity 18 may be formed by fusion splicing a small silica tube having silica sidewalls 20 (the silica tube having an internal diameter approximately 75 μm, outer diameter approximately 125 μm, wall thickness approximately 25 μm, and length approximately 20 μm) to a conventional single-mode fiber (SMF) on the left end (or light source end) and to a specialty side-hole fiber (SHF) on the right end (or air source end).

Side-hole fiber (SHF) 22 has two side holes 26 (the side holes having diameters approximately 20 μm) on the two sides of its core 24 (the side holes positioned approximately 10 μm from center of the core). The side holes provide two gas/air channels running the length of the side hole fiber longitudinally. Side-hole fiber 22 may also be fusion spliced to the silica tube on one end of Fabry-Perot Interferometer 16 to form the second silica-cavity Fabry-Perot Interferometer (the second silica-cavity Fabry-Perot Interferometer having a length ~25 μm) in tandem with the first air/gas-cavity Fabry-Perot Interferometer. Air channels 26 are mechanically connected to air cavity 18 on one end and in-use open on the other end such that air flows through air channels 26 to air cavity 18 and vice versa, in other words during use air channels 26 are open for air flow. Thus air channels 26 are air through-holes. However, during calibration the air source side of the side holes (i.e., open ends) may be connected to a pressure source such as a pressure hose. The two cavity lengths, air cavity 16 and side-hole fiber cavity 26 may be varied to tune accuracy and measurement dynamic range.

In one design configuration, the silica-cavity Fabry-Perot Interferometer (mirror 30) is mostly sensitive to temperature (T), while the air-cavity Fabry-Perot Interferometer (mirror 32) is more sensitive to pressure (P). The cascaded Fabry-Perot Interferometer structure is interrogated by an optical source, advantageously a broadband light source such as a superluminescent diode (SLD) light source or a fiber amplified spontaneous emission (ASE) light source, bidirectionally through the conventional single-mode fiber lead. The single-mode fiber lead is connected to a photodetector through a fiber-optic circulator. Photocurrents on the photodetector are converted to voltages that are then provided to post-detection electronic processing subsystem. In an advantageous embodiment, a photodetector array, an optical source (e.g., a broadband light source), and a fiber-optic circulator, and post detection signal processes may be housed in an interrogator connected to the single-mode fiber lead.

As shown in FIGS. 1A and 1B, repeated interference of light reflected from three small "micro mirrors" (silica-air interfaces) that are made on the fiber at positions 30, 32, and 34, transmit the pressure and temperature information to the photodetector for post-detection processing to separate the temperature and pressure values. Post-detection signal processing post-detection processing to separate the temperature and pressure values through Fourier Transform (FT) processing by analytical non-discrete derivation methods and by template matching data against calibration reference points (for example, calibration may be performed at sensor build).

FIG. 2 is a side-view micrograph of a fiber optic sensor in accordance with the disclosed subject matter and showing a lead-in single mode fiber, an air cavity, and a side-hole fiber cavity. And FIG. 3 is an end-view cross-sectional micrograph of a side-hole fiber and side-hole fiber cavities 42 and 44 symmetrically surrounding core 46 in cladding 48 in accordance with the disclosed subject matter.

The term "symmetrically" in reference to the position of side-hole fiber cavities around the fiber optic core of the side-hole optical fiber is intended to refer to a balanced position and number of cavities around the core to reduce fiber birefringence and optical losses in the fiber optic core. The side-holes provided are symmetrically positioned around the fiber optic core of the side-hole optical fiber. And advantageously, to reduce birefringence, the center of the side-hole fiber (and thus the center of the core of the side-hole fiber) to the innermost wall of a side-hole cavity is at least five times the radius of the fiber optic core of the side-hole optical fiber. In other words, the two hollow cavity holes are symmetrically positioned from the center of the side-hole optical fiber at a distance at least as great as five times the radius of the fiber optic core of the side-hole optical fiber.

Side-Hole Fiber (SHF) Birefringence and Polarization. Side-hole optical fibers may be birefringent because of the two side holes—similar to polarization maintaining fiber PMF principles. Pressure-induced forces in the holes of the side-hole fiber, if high enough, may increase the fiber birefringence and optical losses in the core. In the presence of hydrostatic pressure in the side holes, an anisotropic stress distribution is induced in the core, which further induces birefringence and index changes via the photo-elastic effect. State of polarization or depolarization of the optical source as well as inside the Fabry-Perot Interferometer cavities affect the interference visibilities and fiber lead sensitivities. Pressure-induced birefringence affects the sensor calibration in certain configurations.

Sensor performance may be tuned by modifying geometries of the side-hole fiber microstructure. The side-hole cavities of the side-hole optical fiber may be formed by micromachining, for example laser-micromachining, the cavities at the end of a single-mode optical fiber to form the through-hole air channels. FIG. 4 is an end-view cross-sectional diagram of a side-hole fiber and side-hole fiber cavities 52 and 54 symmetrically surrounding core 56 in cladding 58 along with side-hole fiber structure terminology.

Figure 5:
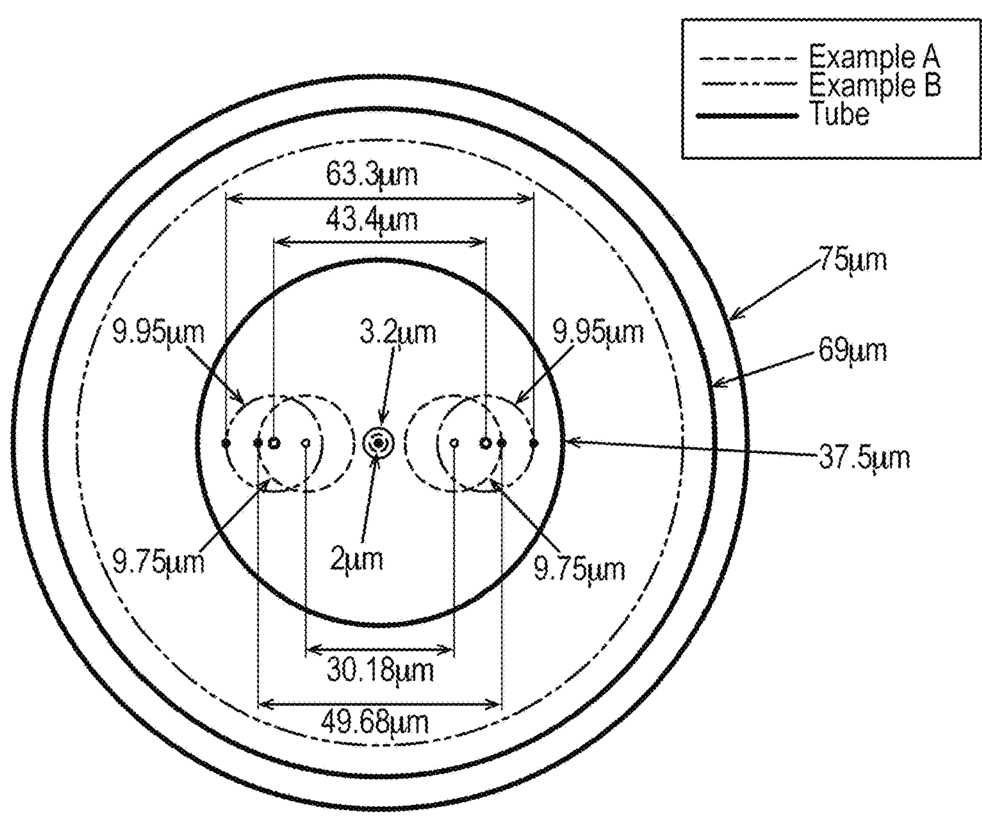
FIG. 5 is an end-view cross-sectional diagram showing two side-hole fiber embodiments (Side-Hole Fiber Example A and Side-Hole Fiber Example B) overlying a hollow tube connected to the side-hole fiber embodiments.
Figure 6:
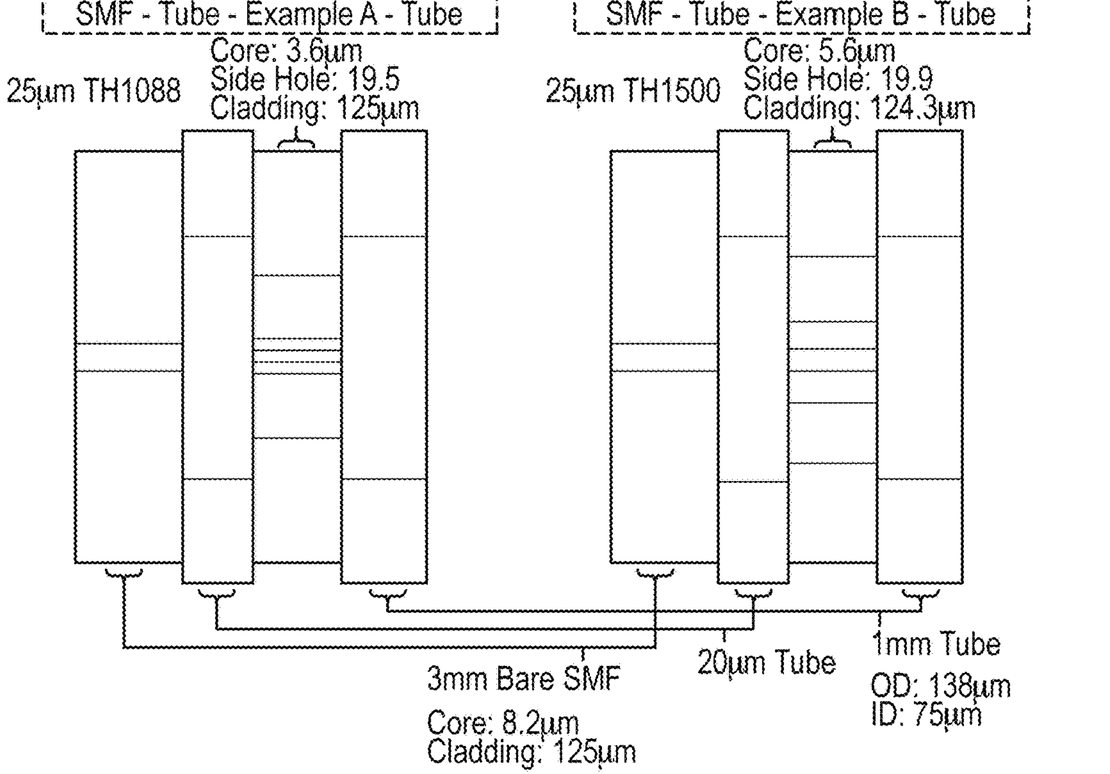
FIG. 6 is an side-view cross-sectional diagram of a multi-mirror optical sensor.

FIG. 5 is an end-view cross-sectional diagram showing two side-hole fiber embodiments (Side-Hole Fiber Example A and Side-Hole Fiber Example B) overlying a hollow tube connected to the side-hole fiber embodiments. FIG. 6 is a side-view cross-sectional diagram of a multi-mirror optical sensor showing the two side hole fiber embodiments (Side-Hole Fiber Example A and Side-Hole Fiber Example B) and hollow tube of FIG. 5 with a bare single-mode fiber (SMF) on the optical source side and an end hollow tube on the air source side.

Figure 7:
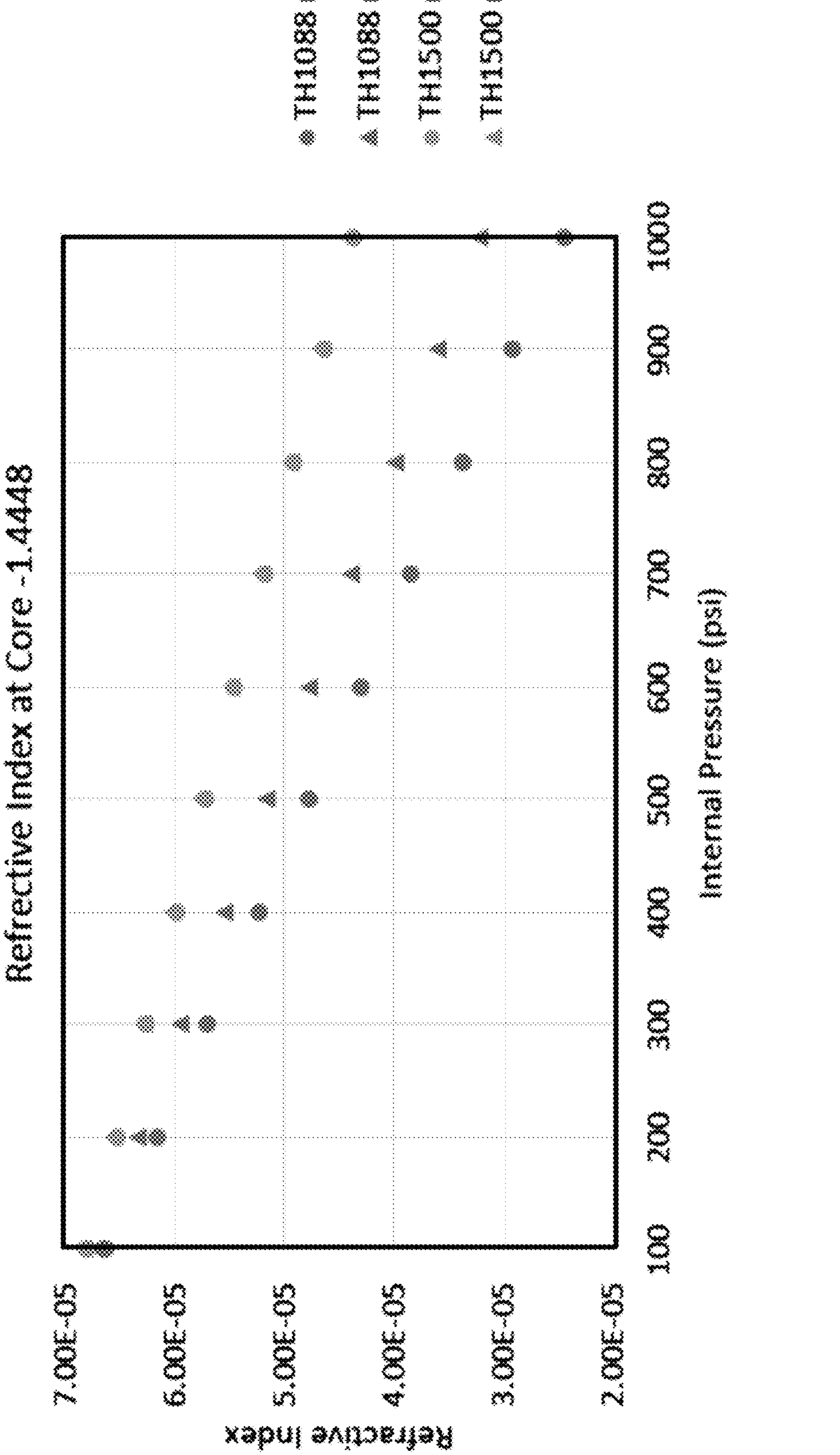
FIG. 7 is a graph showing the Refractive Index at Core −1.4448.
Figure 8:
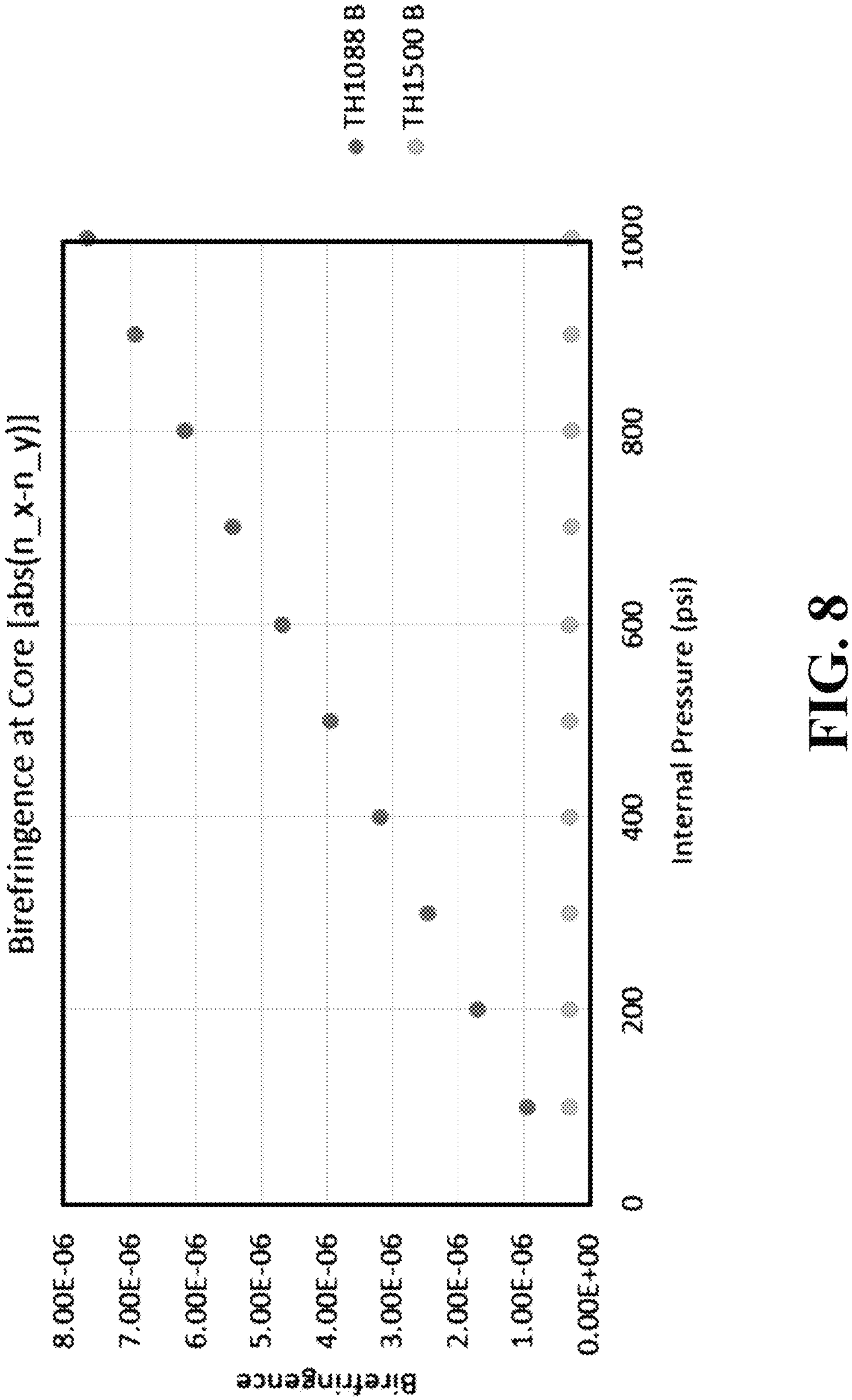
FIG. 8 is a graph showing the Birefringence at Core [abs(n_x_y)].
Figure 9:
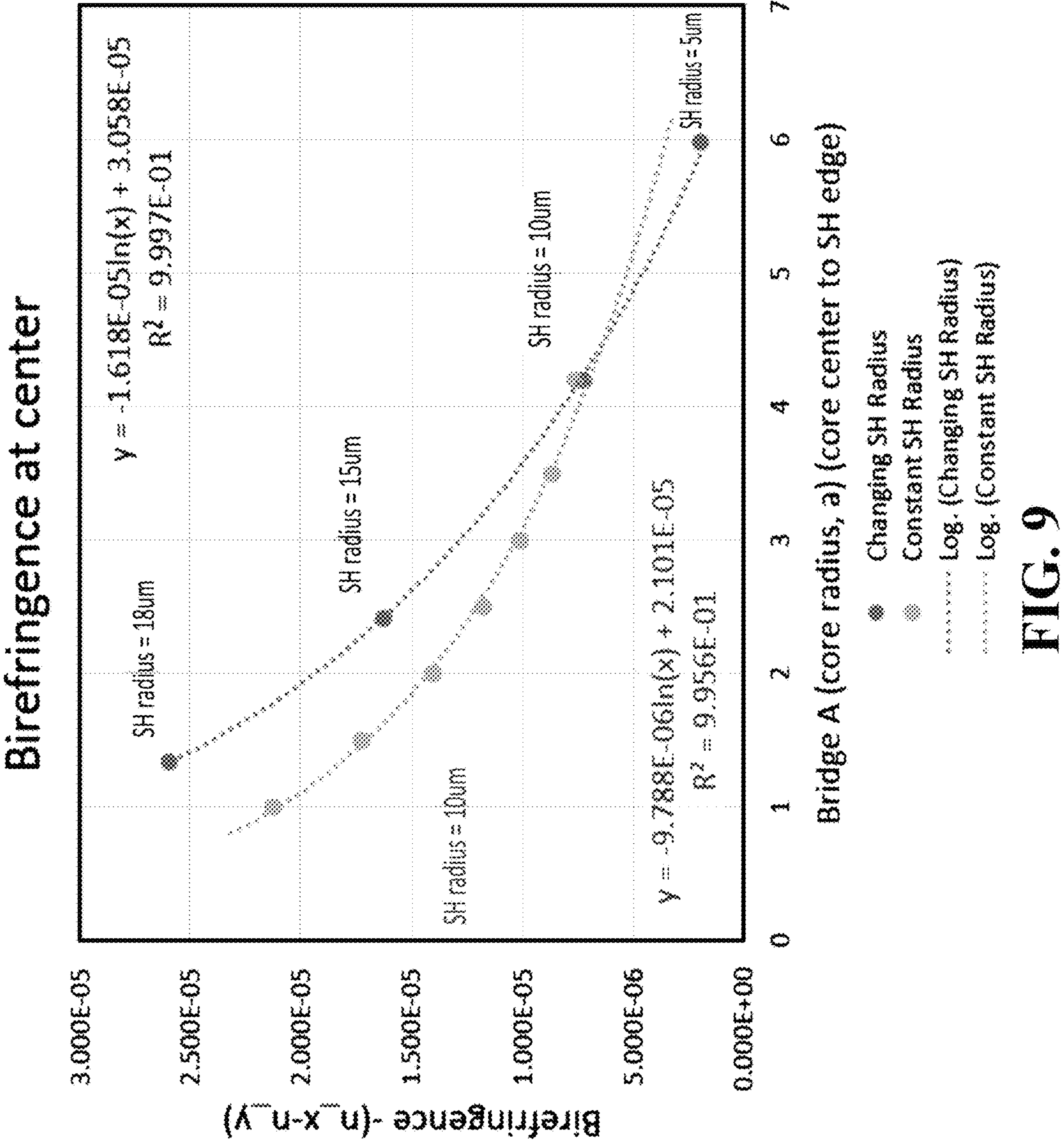
FIG. 9 is a graph showing the Birefringence at Center.
Figure 10:
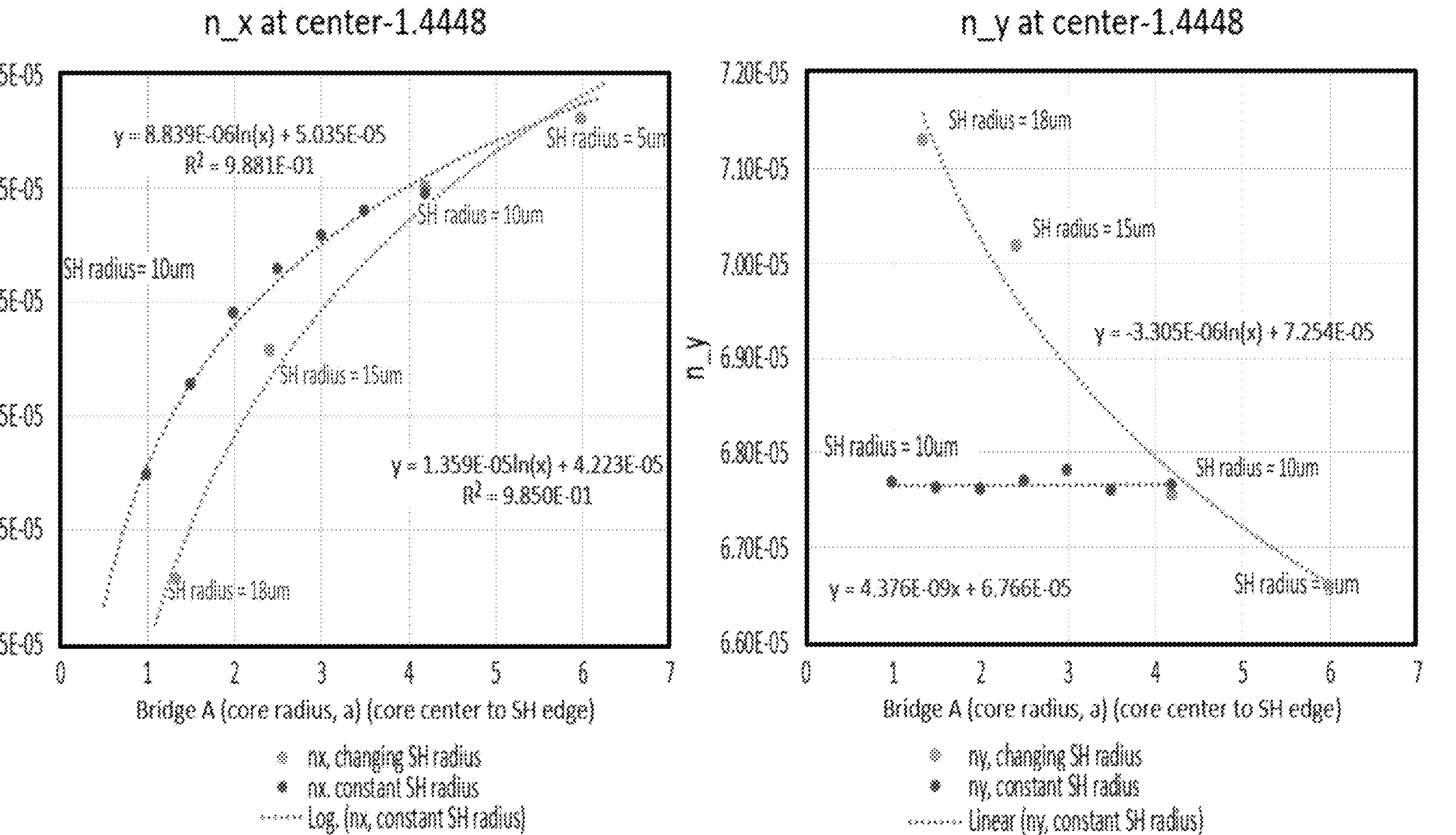
FIG. 10 is a graph showing n_x at center −1.4448 and a graph showing n_y at center −1.4448

FIGS. 7 through 10 are graphs relating to the calculations below. FIG. 7 is a graph showing the Refractive Index at Core −1.4448. FIG. 8 is a graph showing the Birefringence at Core [abs(n_x_y)]. FIG. 9 is a graph showing the Birefringence at Center. FIG. 10 is a graph showing n_x at center −1.4448 and a graph showing n_y at center −1.4448

Birefringence of Refractive Index for SHF Over Pressure for Side-Hole Example A

- Refractive index decreases with increasing pressure
- N_x and N_y components diverge with increasing pressure
- Birefringence increases with increasing pressure (due to divergence of N_x and N_y)

Birefringence of Refractive Index for SHF Over Pressure for Side-Hole Example B

- Refractive index decreases with increasing pressure
- N_x and N_y components do not diverge with increasing pressure
- Birefringence constant with increasing pressure From the plots it may be seen that Side-Hole Example B has less birefringence induced because the side-holes are farther from the core. Both types show a reduction in refractive index with stress, but Side-Hole Example A shows different magnitudes of changes in its nx and ny which is what induces birefringence.

Birefringence vs Bridge A and Side-Hole (SH) Radius. Birefringence of the core is maximized by increasing the radius of the side holes and bringing the side-holes closer to the core. Birefringence is maximized by increasing SH radius and decreasing bridge A. In other words, the more the side holes crowd the core, the more stress is transferred into the core to cause birefringence.

TABLE A

| Changing side hole radius | | |
|---|---|---|
| Side Hole Radius (μm) | Bridge A (μm) | Birefringence at center |
| 18 | 3.75 | −2.6E−05 |
| 15 | 6.75 | −1.65E−05 |
| 10 | 11.75 | −7.60E−06 |
| 5 | 16.75 | −2.00E−07 |
| 0 | 62.75 | −1.00E−09 |

TABLE B

| Constant side hole radius, Changing Bridge A | | |
|---|---|---|
| Side Hole Radius (μm) | Bridge A (μm) | Birefringence at center |
| 10 | 11.75 | −8.00E−06 |
| 10 | 9.8 | −9.10E−06 |
| 10 | 8.4 | −1.05E−05 |
| 10 | 7 | −1.23E−05 |

TABLE B-continued

| Constant side hole radius, Changing Bridge A | | |
|---|---|---|
| Side Hole Radius (μm) | Bridge A (μm) | Birefringence at center |
| 10 | 5.6 | −1.46E−05 |
| 10 | 4.2 | −1.81E−05 |
| 10 | 2.8 | −2.25E−05 |

Refractive Index Vs Bridge A and SH Radius

N_x Primarily Affected by Bridge A (Increase in Bridge A OR Decrease in SH Radius=Increase in n_x)

- See plot on left, n_x changes in both constant radius and changing SH radius case
- decreasing the side hole radius will increase n_x at the core
- moving the side holes farther from the core will increase n_x at the core N_y Primarily Affected by SH Radius (Increase in SH Radius=Increase in n_y; Independent of Bridge A)

- see plot on right, n_y is constant in constant SH radius case
- increasing side hole radius increases n_y at the core Plot Data Colors:

- Changing Bridge A length (Orange plots)
- Changing side hole diameter (blue plots)
- Birefringence is effectively zero without the side-holes.

Air Cavity. Cavity length changes for an air cavity under constant T and variable P can be modeled as $$\Delta OPD_1(\Delta P) = 2\cdot\Delta L = \beta_1\cdot\Delta P = 2\frac{L_1(1-2\mu)R_0^2}{E(R_0^2-R^2)}\Delta P$$

Using this model, it may be estimated the change in length wrt change in pressure of the sensor to be:

$$\frac{dL}{dP} = \frac{L_1(1-2\mu)R_0^2}{E(R_0^2-R^2)} \sim 2.4501\frac{pm}{\text{psi}}$$

Where:

$L_1$=30 um (initial cavity length)

μ=~0.17 (Poissons ratio)

$R_0$=62.5 um (fiber radius)

E=~72.4 GPa (Youngs Modulus)

R=30 um (cavity radius)

In other words, 408 psi required to cause a 1 nm change in cavity length using the specs of a commercially available sensor.

Silica Cavity. Length changes for a silica cavity under constant T and variable P may be modeled as $$\Delta OPD_2(\Delta P) = \beta_2\cdot\Delta P = 2\left[\frac{L_1(1-2\mu)R_0^2}{E(R_0^2-R^2)} + \frac{nL_2(1-2\mu)}{E} + \alpha_n nL_2\right]\Delta P$$

$$\alpha_n = -\frac{n^2(1-2\mu)[P_{12}-\mu(P_{11}+P_{12})]}{2E}$$

Alpha is a refractive index variation coefficient due to pressure, betas are pressure coefficients, mu is Poisson's ratio (~0.17), R0 is fiber radius, R is air hole radius, E is Young's modulus (~72.4 Gpa), L is initial cavity length.

Other FPI Equations Include:

$$\text{Derivative } wrt\ T\text{: } \frac{dFSR}{dT} \sim \frac{\lambda_0^2}{2} * \frac{d}{dT}\left(\frac{1}{nL}\right) = \frac{\lambda_0^2}{2} * \left(\frac{1}{L}\frac{d}{dT}\frac{1}{n} + \frac{1}{n}\frac{d}{dT}\frac{1}{L}\right) = \frac{-\lambda_0^2}{2nL} * \left(\frac{1}{n}\frac{dn}{dT} + \frac{1}{L}\frac{dL}{dT}\right) = -FSR * \left(\frac{1}{n}\frac{dn}{dT} + \frac{1}{L}\frac{dL}{dT}\right)$$

$$\text{Derivative } wrt\ T\text{: } \frac{dOPL}{dT} \sim \frac{d}{dT}(nL) = L\frac{dn}{dT} + n\frac{dL}{dT}$$

$$\text{Derivative } wrt\ L\text{: } \frac{dFSR}{dL} \sim \frac{\lambda_0^2}{2n} * \frac{d}{dL}\left(\frac{1}{L}\right) = \frac{-\lambda_0^2}{2nL^2}$$

Operating Vacuum Wavelength: l0~1.55 μm $$FSR = \frac{\lambda_0^2}{2nL} = \frac{\lambda_0^2}{2 * OPL}$$

Air-Cavity FPI: ($L_{air}$~30 μm->single-trip OPL~30 μm)->FSR~40 nm $$\text{Spatial Frequency for } ith \text{ point in } FFT = \frac{2i\pi}{\Delta\lambda}$$

$$S = \frac{\partial\lambda}{\partial T} = \left(\frac{1}{n_{co}}\frac{\partial n_{co}}{\partial T} + \frac{1}{L_2}\frac{\partial L_2}{\partial T}\right)\lambda = (\alpha_T + \xi_T)\lambda$$

$$OPL = SpFreq * \frac{\lambda_0^2}{4\pi n}$$

$$\text{Single Trip } OPL \text{ for } ith \text{ point in } FFT = \frac{i\lambda_0^2}{2n\Delta\lambda}$$

The dense free spectral range (FSR) corresponding to the long cavity may be derived as:

$$FSR = \frac{\lambda^2}{2n_{co}L_2}$$

The temperature sensitivity of the dense fringes of the FPI probe may be obtained by:

$$S = \frac{\partial\lambda}{\partial T} = \left(\frac{1}{n_{co}}\frac{\partial n_{co}}{\partial T} + \frac{1}{L_2}\frac{\partial L_2}{\partial T}\right)\lambda = (\alpha_T + \xi_T)\lambda$$

Where alpha sub t is the thermo-optic coefficient and epsilon sub t is the thermal expansion coefficient. Thus by monitoring the wavelength shift of the reflection spectrum, the temperature may be measured in real time.

The multi-mirror sensor design structure may have a long lead-in single-mode fiber such that the cascaded dual-cavity Fabry-Perot Interferometer, and the lead-in single-mode fiber, may be exposed to harsh and high temperature environmental elements.

Figures 11A, 11B, 12:
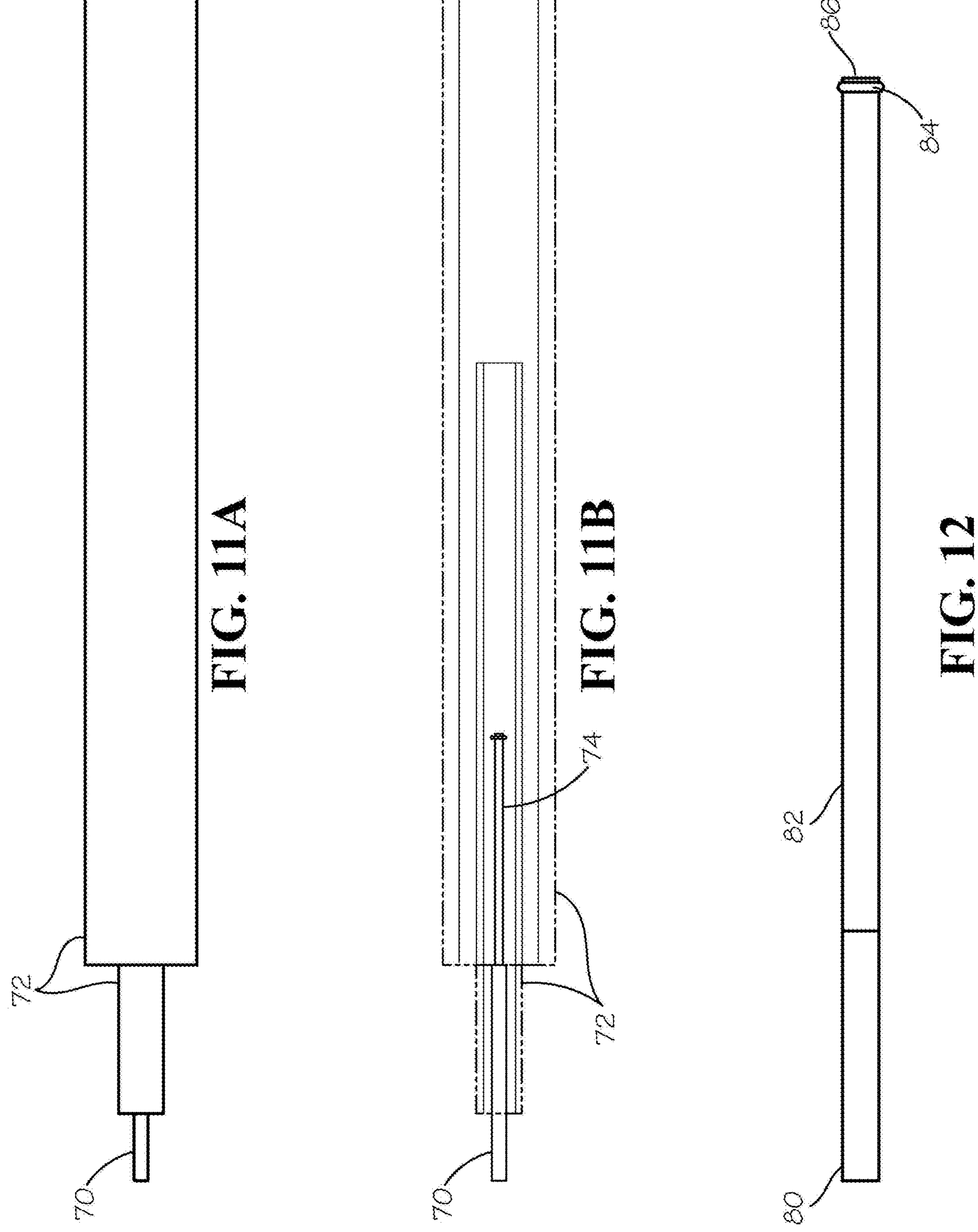
FIG. 11A is a diagram showing a side view of lead-in SMF connected to an FPI sensor packaged in steel tubing and FIG. 11B is a transparent diagram of the sensor of FIG. 11A.
FIG. 12 is a schematic diagram showing a side view of a sensor head.
Figure 13:
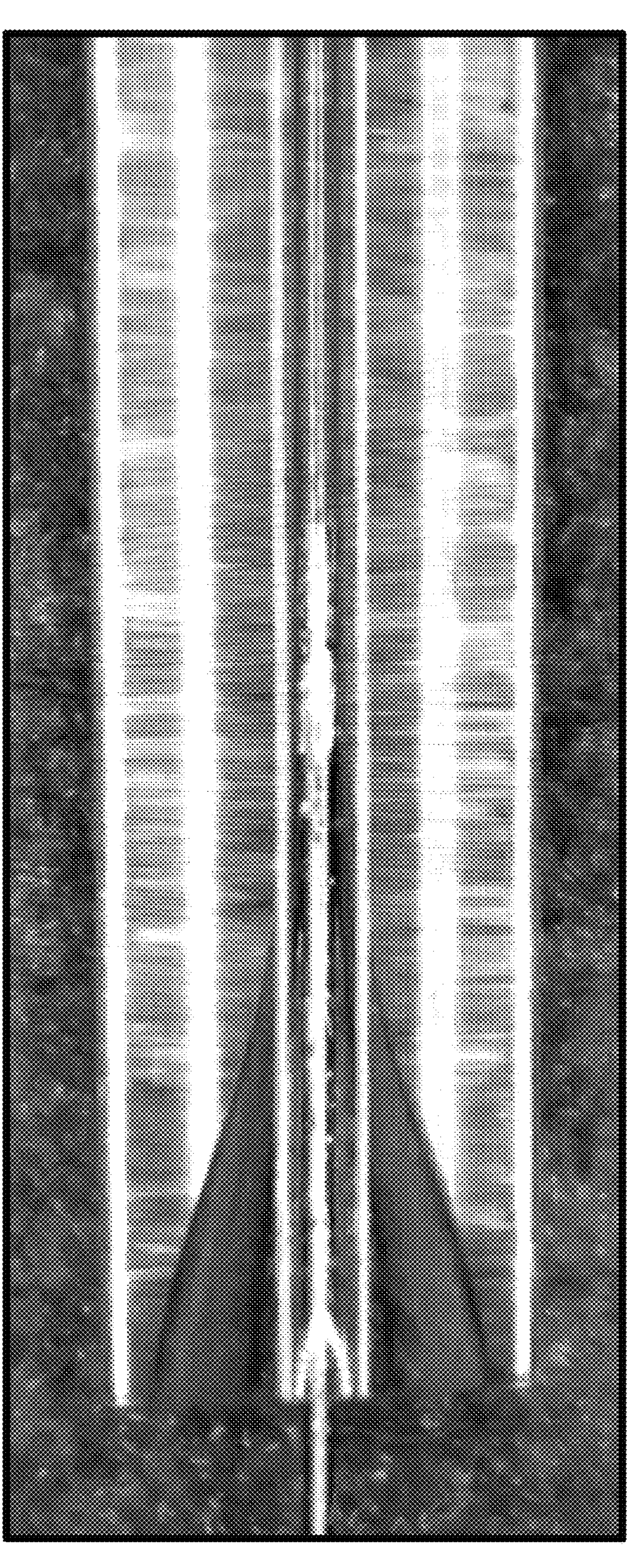
FIG. 13 is a micrograph of a gold coated lead-in SMF.

For harsh environments, the sensor head may be packaged within a steel tube as shown in FIGS. 11A and 11B. FIG. 11A is a diagram showing a side view of lead-in SMF 70 connected to FPI sensor 74 packaged in steel tubing 72 and FIG. 11B is a transparent diagram of the sensor of FIG. 11A to show the FPI sensor 74 housed in steel tubing 72. A steel tube packaging process is summarized below:

1. Prepare steel tube (23TW304, OD=0.635 mm, ID=0.4318 mm, 10 mm length)
2. Insert FP sensor into steel tube
3. Secure with Epoxy 940LE
4. Prepare second steel tube (OD=1.5875 mm, ID=1.0795 mm, variable length)
5. Insert FP sensor+small steel tube into second steel tube
6. Secure with Epoxy 940LE
7. Cover area with Gorilla Weld
8. Enclose in shrink tube And for high-temperature operation, the sensor head may be fabricated by using a gold-coated SMF lead fusion spliced to the silica tube. FIG. 12 is a diagram showing a side view (closer to approximate scale) of a sensor head showing the gold coated portion 80 of the single-mode fiber connector which may be one meter plus in length, a bare (non-gold coated) portion 82 of single-mode fiber forming the lead-in single mode fiber which may be approximately three millimeters in length, polymicro tube 84 forming the hollow tube and which may be approximately twenty microns in length, and side-hole fiber 86 such as Side-Hole Example A side-hole fiber from FIG. 5 which may be approximately twenty five microns in length. The sensor head is shown schematically in FIG. 12. FIG. 13 is a micrograph of a gold coated lead-in SMF. A gold-coated SMF lead fusion fabrication process is summarized below:

1. Dip single mode fiber with gold coating into gold test acid solutions for 4 hrs to remove coating
2. Cleave fiber to leave 3 mm bare SMF
3. Remove tube polyimide coating
4. Fusion splice tube to bare SMF
5. Cut tube to leave ~20 micron (tube forms air cavity FPI)
6. Fusion splice side hole fiber to tube
7. Cleave THF to leave ~25 micron (THF forms silica cavity FPI)

Signal processing innovations provide a critical advantage in real time temperature and pressure measurement. These innovations may be particularly advantageous, for example for improved durability and lower cost when the optical source is a broadband optical source.

Fourier Transform (FT) processing may be accomplished according to the following.

Method of Data Analysis

The dense fringes of the reflection spectra—see FIG. 8—are attributed to the silica fiber cavity FPI, which is superimposed by a slow envelope corresponding to the air-cavity FPI. These periodic features are separated and quantified in the frequency domain using Fast Fourier transform (FFT)—see FIG. 3. The normalized reflection spectral amplitude of a single cavity FPI is described as follows:

$$I_N = A + B\text{coscos}(4\pi d/\lambda + C)$$

Where $I_N$ is the normalized reflection spectral amplitude; A, B and C are constants; d is the optical path length or single-trip OPL (product of the cavity refractive index n and the FPI cavity length L); and λ is the optical wavelength. It is important to note here that, in general, the single-trip OPL, d, is a function of both P and T depending upon the specific sensor design.

Figure 15:
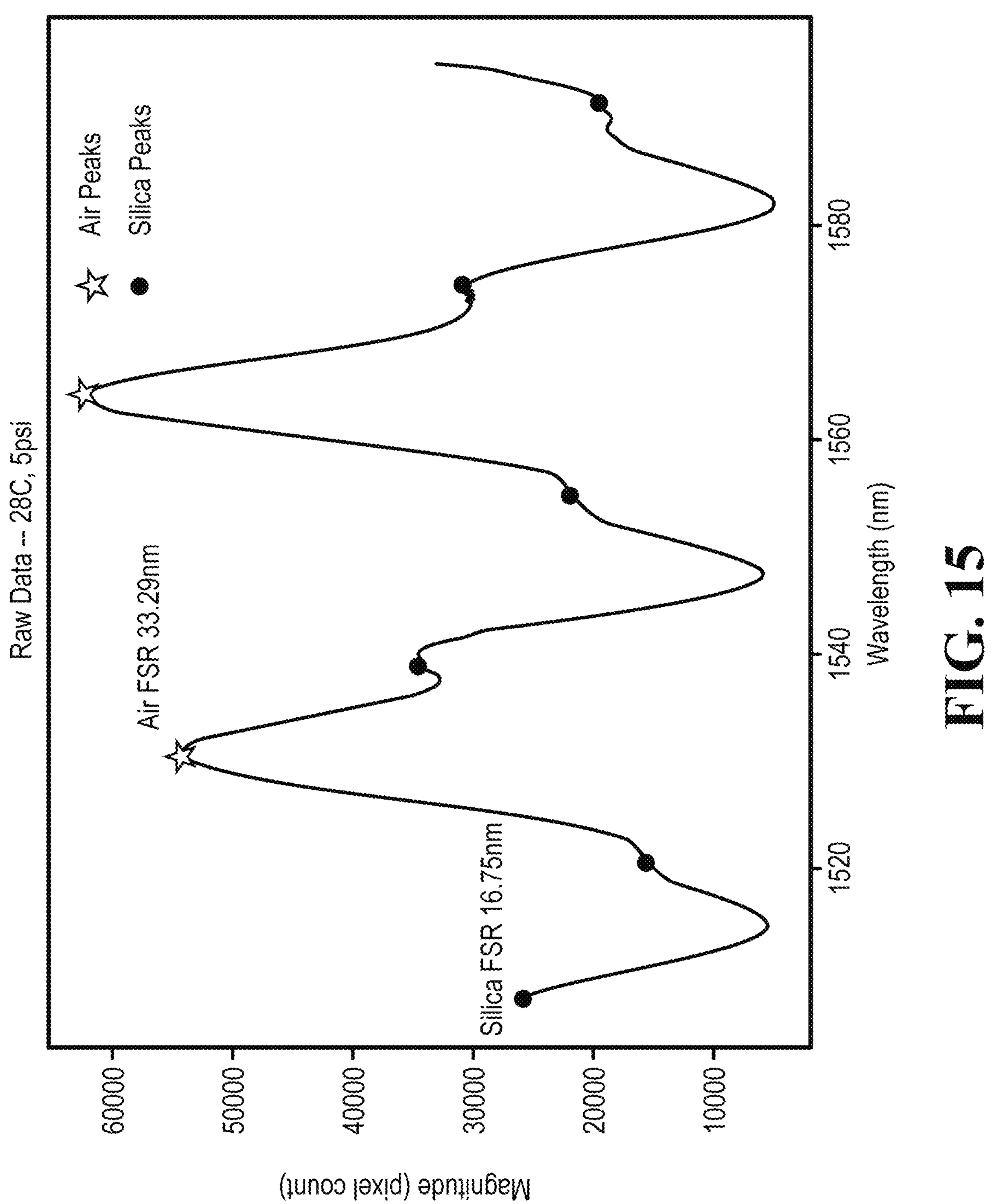
FIGS. 15 and 16 are graphs showing raw sensor data in terms of wavelength

The following expression represents the normalized spectral intensity of a double cavity FPI for the sensor structure shown in FIGS. 1A and 1B:

$$I_N = A + B\cos\cos(4\pi d1/\lambda + C) + D\cos\cos(4\pi d2/\lambda + E) + F\cos\cos(4\pi(d1 + d2)/\lambda + G),$$

where A-G are constants and d1 and d2 are the single-trip OPLs of the two FPIs. Pressure and temperature can be measured through monitoring the periodicities present in the normalized composite spectra of the cascaded FPIs, as shown in the graph of FIG. 15. FIG. 15 is a graph showing measured FPI composite baseline spectra as a function of λ.

Figure 14:
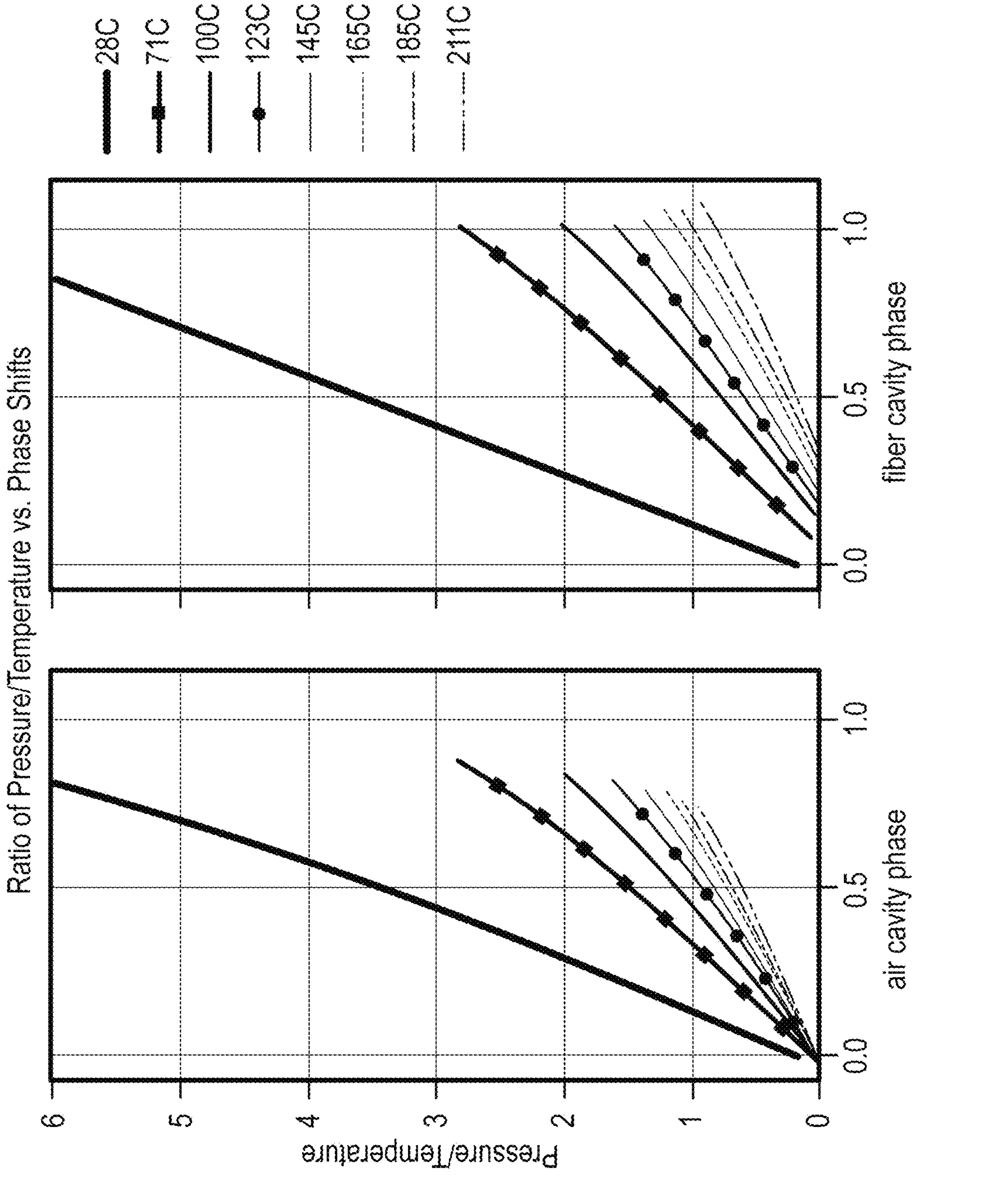
FIG. 14 are graphs showing calibration lines for (a) air-cavity FPI and (b) silica-cavity FPI.

Digital signal processing techniques such as Discrete Fourier Transform (DFT) and Z-transform can be used for identifying periodicities (spectral peaks related to d1 and d2) in a signal with a finite number of spectral data points. Identified periodicities (spectral peaks related to d1 and d2) are used in the calculation of P and T through applying a set of calibration curves. The calibration curves are constructed using data from a series of P and T measurements at known reference values, as shown in the graph of FIGS. 14 (*a*) and 14B 9*b*). FIGS. 14 (*a*) and 14 (*b*) are graphs showing calibration lines for (a) air-cavity FPI and (b) silica-cavity FPI.

Example of FPI Sensor Analysis

Figure 16:
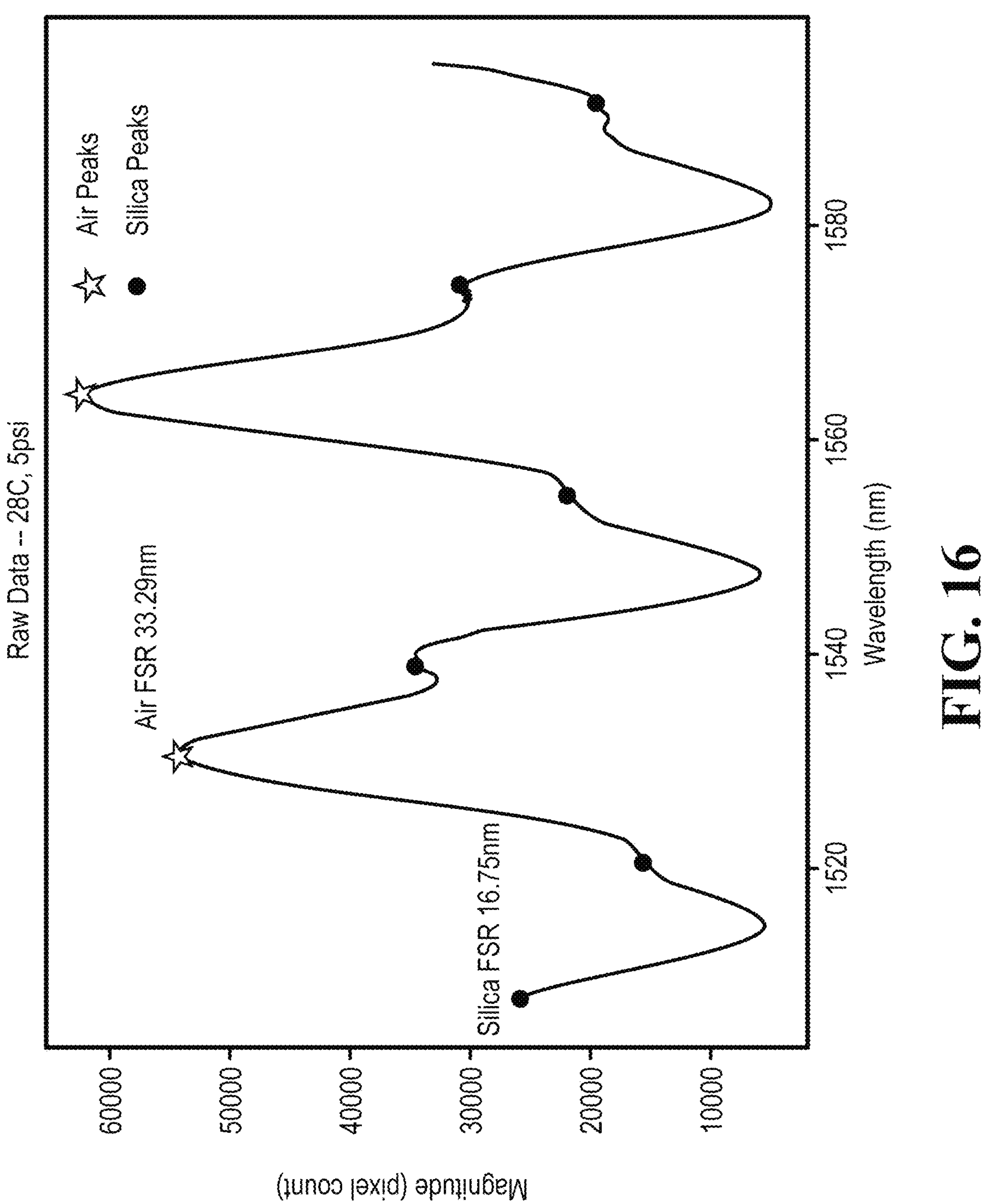

The plot of the graph of FIG. 15 shows the raw sensor data in terms of wavelength (1507.70-1595.39 nm, span=87.69 nm, # of samples=512, sample spacing=0.17 nm) and frequency (198.98-188.04 THz, span=10.94 THz, # of samples=512, sample spacing=0.021 THz). And the plot of the graph of FIG. 16 shows the raw sensor data in terms of wavelength. In these plots, it may be see that the actual periodicities of the air cavity and silica cavity signals are only half of the periodicities predicted when the FSR is calculated:

To extract the OPL from the sensor spectrum, one starts by taking the Fast Fourier Transform (FFT). The FFT converts the data to the spatial frequency domain. Then, the spatial frequency is converted to the OPL to show how each FPI sensor appears in the FFT according to its properties. Thus one can track the FFT peaks associated with each FPI sensor by referring to the known sizes of each cavity. The spatial frequency is converted to the optical path length (OPL) as follows:

$$\text{Spatial Frequency for } ith \text{ point in } FFT = \frac{2i\pi}{\Delta\lambda}$$

$$OPL = SpFreq * \frac{\lambda_0^2}{4\pi n}$$

$$\text{Single Trip } OPL \text{ for } ith \text{ point in } FFT = \frac{i\lambda_0^2}{2n\Delta\lambda}$$

Where Δλ is the range of the measured spectrum, $\lambda_0$ is 1550 nm, n is the index of refraction. When designing the FPI sensor, it is important to consider the limitations on the OPL sizes that can be detected. These are the primary limitations:

$$1.\ |L_j - L_k| \gg \Delta L;\ \Delta L = \frac{\lambda_0^2}{2n}$$

-continued $$2.\ \Delta L < L_j \ll \frac{\lambda_0^2}{4\pi n\Delta'}$$

Where $L_j$, $L_k$ are OPLs of 2 FPI cavities, ΔL is the filtering resolution of the system, $\lambda_0$ is 1550 nm, n is the index of refraction, is the width of the scanning interval, and Δ is the spectral resolution. For the sample data set, the limit ΔL was calculated to be ~13 um.

Figure 17A:
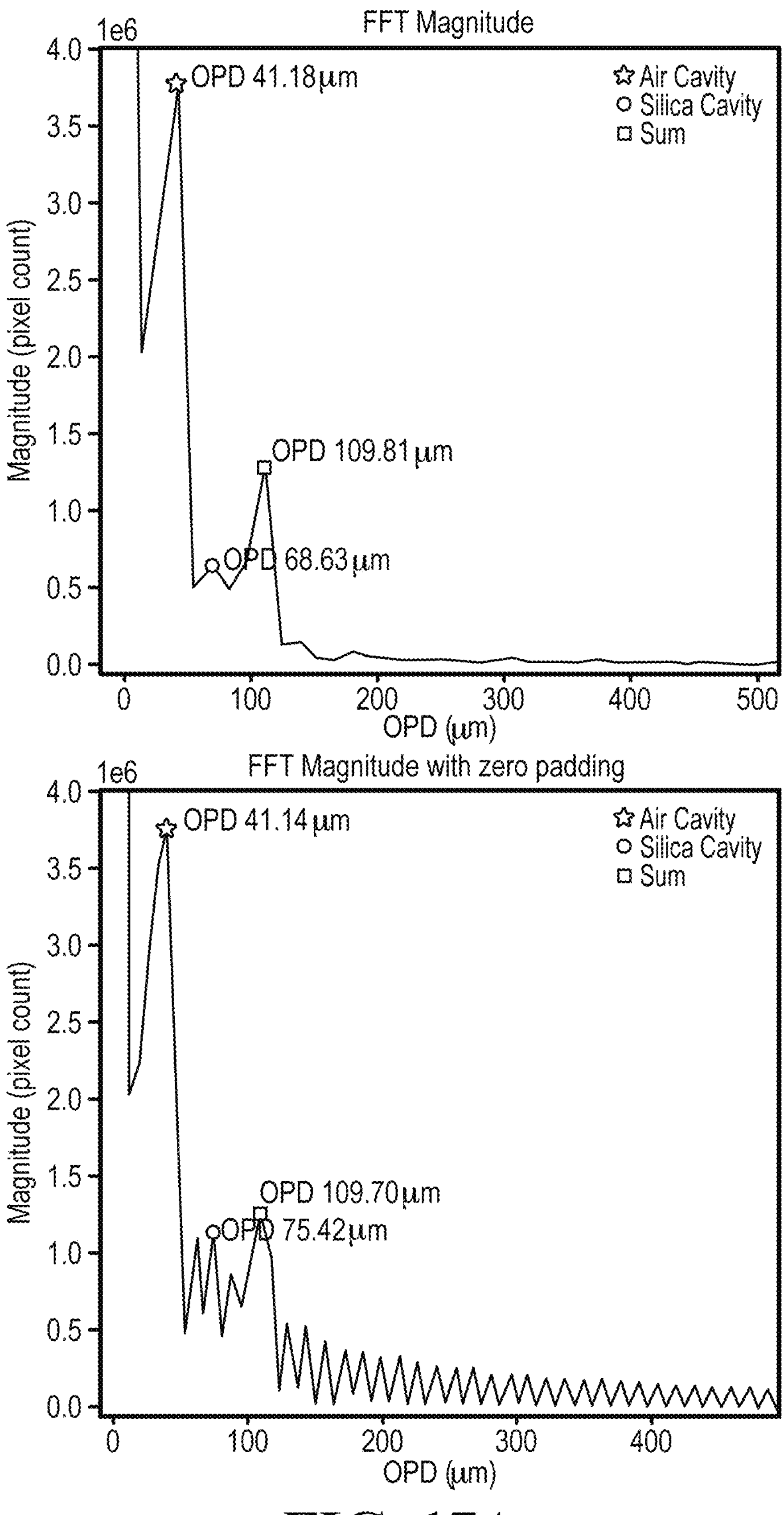
FIGS. 17A and 17B are graphs showing the magnitude (a) and phase (b) of FFT of measured and padded spectra
Figure 17B:
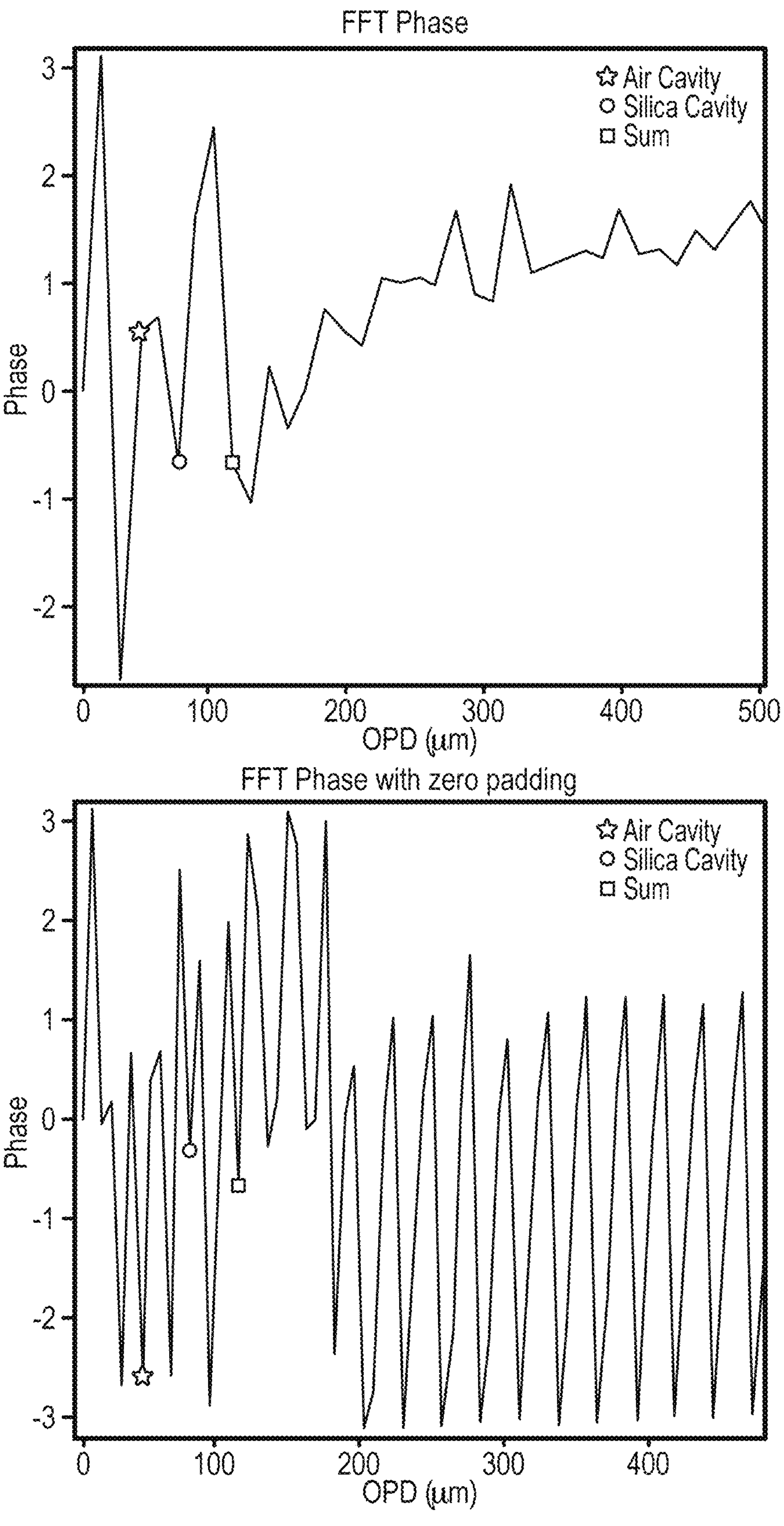

The data was prepared for the FFT by evenly spacing it with respect to wavelength. The plots of the graphs shown in FIGS. 17A and 17B show the FFT magnitude and phase in terms of OPL. It may be seen that the zero padded data has a middle peak with higher amplitude than just the raw data plot. FIGS. 17A and 17B are graphs showing the magnitude (a) and phase (b) of FFT of measured and padded spectra.

The shapes of the raw data and FFT plots match the behavior expected when multiplying 2 sines with different frequencies and different amplitudes. When one takes the FFT of multiplied sines, the FFT will generally have 4 frequency peaks: a peak at the difference in the frequencies, a peak at the lower frequency signal, a peak at the higher frequency signal, and a peak at the sum of the two signal frequencies. In the FFT plots of our data, three peaks can clearly be seen which can be mapped to the air cavity, silica cavity, and sum of signals. Although the fourth peak for the difference of the periodicities is not visible, it may be estimated using the air and silica peaks. This is summarized in the following table.

| | Raw Data | Zero-padded data |
|---|---|---|
| Wavelength range of data set (nm) | 87.69 | 175.38 |
| Spatial Frequency of Peaks (1/nm) | ~143.3, 214.95, 358.25, 573.21 | ~178.95, 214.74, 393.69, 572.65 |
| Calculated OPD of Peaks (um) | ~27.45, 41.18, 68.63, 109.81 | ~34.28, 41.14, 75.42, 109.7 |

An understanding of the FFT behavior for the multiplication of sines may be used to help confirm which FFT peaks are associated with each cavity. Furthermore, the periodicities found from the FFT match the periodicities observed in the raw data.

Signal Processing Methodology Based on Template Matching—i.e., Spectral Pattern Matching A FPI algorithmic approach. The signal processing path from spectral snapshot to resolved temperature and pressure is listed below. Pre-recorded spectrum captures dispersed throughout the intended range of measurement are prerequisite and must be empirically captured in a highly repeatable formalized process for maximum accuracy/precision:

1. A snapshot of the reflected spectrum is taken at unknown pressure and temperature.
2. An estimate/guess of the temperature and pressure is derived from a predictive model using past samples.
3. Two-dimensional 2D interpolation using pre-recorded known calibration points is used to generate a projected spectrum for the estimate.
4. Template matching (normalized cross-correlation) is used to assign a match score number.
5. Nelder-Mead gradient descent is used to iteratively improve the guess until the desired temperature and pressure precision is reached 6. Converged temperature and pressure value is returned in realtime.
7. Predictive model is updated for the optimal processing of the next sample.
8. Back to #1

Given two sensor spectrum measurements, a normalized cross-correlation calculation is a way to quantify their similarity. To perform this on two spectra A and B, each spectrum data point from A is multiplied with the corresponding data point in B and the sum is calculated. With increasing similarity, the sum is correspondingly higher. Normalization of both A and B must be done to ensure absolute amplitude is irrelevant and its only the shape that matters. Normalization is performed by subtraction of the mean and dividing by the standard deviation.

Cross correlation values can be calculated for all pre-captured experimentally determined temperature and pressure datapoints. The highest value one may be used as a good rough estimate, but to increase resolution for cases in between calibration points it becomes necessary to either add more datapoints or interpolate between the nearest neighbors.

Figure 18:
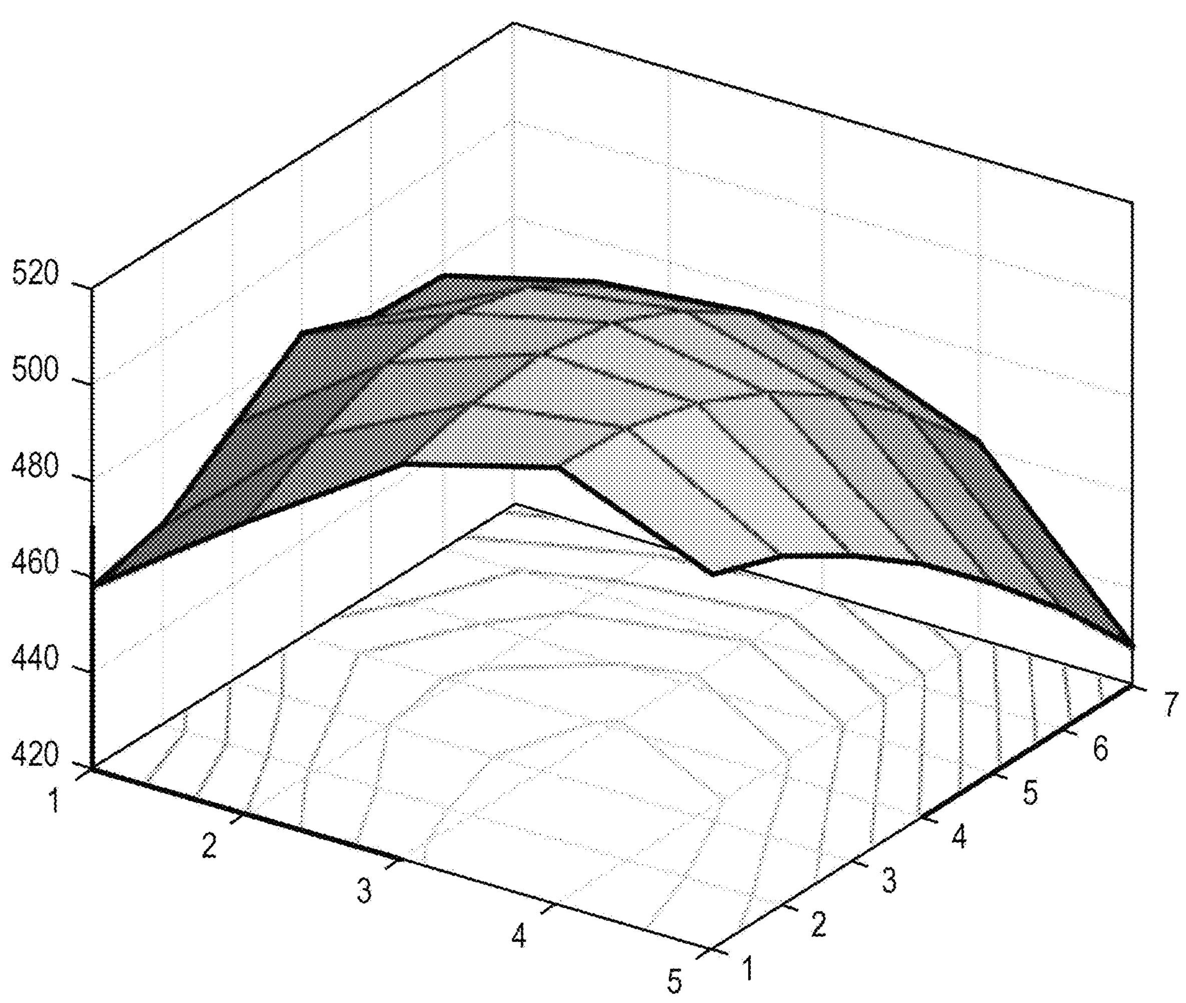
FIG. 18 is a graph showing 2D interpolation tables

The template pattern matching cross correlation values can also be calculated by blending adjacent experimental datapoints. However, since the templates vary by both temperature and pressure, it becomes necessary to use 2D interpolation. For each composite spectrum datapoint, a 2D interpolation table is created from available experimental data. If the interrogator acquires composite spectra corresponding to five pressure and seven temperature datapoints, for example, for a total of thirty five composite spectra datapoints, there will be thirty five separate composite spectra to be used to generate 2D interpolation tables that will be used to generate a predicted spectral response which may be used for pattern matching—as shown in the graph of FIG. 18.

For example, in a reference C++ implementation, this interpolation is performed using the GNU Science Library. The GSL library allows for switching between bilinear interpolation and bicubic interpolation, should there ever be a preference. It is likely that the default bilinear interpolation will be sufficient and that pursuing better results via more calibration points may be more fruitful than higher order interpolations.

Using 2d interpolation, there is now an infinite number of patterns to match against. Prior to incorporating 2D interpolation, it was conceivable to brute force cross correlate all experimental datapoints and simply return the best match. However even this is unnecessary as the cross correlation values create a smooth 3-d surface that the Nelder-Mead gradient descent algorithm will have no problem converging a solution for. With the added ability to interpolate, using gradient descent becomes an absolute necessity.

The reference C++ implementation uses the Nelder Mead derivative-free minimizer implemented in the GNU Science Library GSL. Each subsequent sample uses the previously converged temperature/pressure calculation as the initial guess. This way, computation time is minimized in the case of slow moving signals. The initial step size may be tuned so that only the most likely result would be returned when there is a possibility the phase shift of the mixed frequencies exceeds 180 degrees.

The mixing of the two cavity interference pattern frequencies create both sum and difference sidebands in the FFT domain that must not overlap another sensor. The FFT may be used to split the signal into fully separate signals in the frequency domain. These two frequency domain arrays have zeroes placed in bins corresponding to the bins of other sensors. Then, the inverse-FFT is computed and parallel and separate gradient descents are calculated from separate interpolation tables.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A fiber-optic apparatus, comprising:

a multi-mirror optical sensor having an optical source side and an air source side opposite the optical source side;

said multi-mirror optical sensor having a single-mode optical fiber connected to an optical source and a photodetector on said optical source side and connected to a hollow tube forming a first Fabry-Perot Interferometer on said air source side, said single-mode optical fiber having an optical fiber core;

said hollow tube forming a first Fabry-Perot Interferometer having an air cavity, said core of said single-mode optical fiber and said air cavity of said first Fabry-Perot Interferometer forming a first mirror for reflecting optical light from said optical source;

said air source side of said hollow tube connected to a side-hole optical fiber forming a second Fabry-Perot Interferometer, said side-hole optical fiber having an optical fiber core and at least two hollow cavity holes symmetrically positioned around said optical fiber core of said side-hole optical fiber and running longitudinally the length of said side-hole optical fiber;

said air cavity of said first Fabry-Perot Interferometer to said optical fiber core of said side-hole optical fiber forming a second mirror for reflecting optical light from said optical source;

said at least two hollow cavity holes of said side-hole optical fiber providing an air flow channel to said air cavity of said hollow tube from said air source side of said multi-mirror optical sensor; and the end of said optical fiber core of said side-hole optical fiber at said air source side forming a third mirror for reflecting optical light from said optical source.

2. The fiber-optic apparatus of claim 1, wherein said side-hole optical fiber has two hollow cavity holes.

3. The fiber-optic apparatus of claim 2, wherein said two hollow cavity holes are cylindrical.

4. The fiber-optic apparatus of claim 1, wherein said core of said single-mode optical fiber and said side-hole optical fiber is silica.

5. The fiber-optic apparatus of claim 1, wherein said optical source is a broadband optical source.

6. The fiber-optic apparatus of claim 5, wherein said broadband optical source is a superluminescent diode (SLD) optical light source.

7. The fiber-optic apparatus of claim 5, wherein said broadband optical source is a fiber amplified spontaneous emission (ASE) optical light source.

8. The fiber-optic apparatus of claim 1, wherein said at least two hollow cavity holes are symmetrically positioned from the center of said side-hole optical fiber at a distance at least as great as five times the radius of said fiber optic core of said side-hole optical fiber.

9. The fiber-optic apparatus of claim 1, wherein said photodetector captures pressure and temperature information transmitted by repeated interference of light reflected from said first mirror, said second mirror, and said third mirror.

10. The fiber-optic apparatus of claim 9, wherein pressure and temperature information are separated from said optical information through Fourier Transform (FT) processing by analytical non-discrete derivation methods.

11. The fiber-optic apparatus of claim 9, wherein pressure and temperature information are separated from said optical information by template matching data against calibration reference points.

12. The fiber-optic apparatus of claim 1, wherein said multi-mirror optical sensor is housed in a steel tubing.

13. The fiber-optic apparatus of claim 1, wherein said single-mode optical fiber is gold coated.

14. The fiber-optic apparatus of claim 1, wherein said at least two hollow cavity holes are micromachined.

15. The fiber-optic apparatus of claim 14, wherein said at least two hollow cavity holes are laser micromachined.

16. A method for capturing pressure and temperature information transmitted by repeated interference of light reflected from a first mirror, a second mirror, and a third mirror, the method operative on:

a multi-mirror optical sensor having an optical source side and an air source side opposite the optical source side;

said multi-mirror optical sensor having a single-mode optical fiber connected to an optical source and a photodetector on said optical source side and connected to a hollow tube forming a first Fabry-Perot Interferometer on said air source side, said single-mode optical fiber having an optical fiber core;

said hollow tube forming a first Fabry-Perot Interferometer having an air cavity, said core of said single-mode optical fiber and said air cavity of said first Fabry-Perot Interferometer forming a first mirror for reflecting optical light from said optical source;

said air source side of said hollow tube connected to a side-hole optical fiber forming a second Fabry-Perot Interferometer, said side-hole optical fiber having an optical fiber core and at least two hollow cavity holes symmetrically positioned around said optical fiber core of said side-hole optical fiber and running longitudinally the length of said side-hole optical fiber;

said air cavity of said first Fabry-Perot Interferometer to said optical fiber core of said side-hole optical fiber forming a second mirror for reflecting optical light from said optical source;

said at least two hollow cavity holes of said side-hole optical fiber providing an air flow channel to said air cavity of said hollow tube from said air source side of said multi-mirror optical sensor; and the end of said optical fiber core of said side-hole optical fiber at said air source side forming a third mirror for reflecting optical light from said optical source.

17. The method of claim 16, wherein said side-hole optical fiber has two hollow cavity holes.

18. The method of claim 17, wherein said two hollow cavity holes are cylindrical.

19. The method of claim 16, wherein said core of said single-mode optical fiber and said side-hole optical fiber is silica.

20. The method of claim 16, wherein said optical source is a broadband optical source.

21. The method of claim 20, wherein said broadband optical source is a fiber amplified spontaneous emission (ASE) optical light source.

22. The method of claim 20, wherein said broadband optical source is a superluminescent diode (SLD) optical light source.

23. The method of claim 16, wherein said at least two hollow cavity holes are symmetrically positioned from the center of said side-hole optical fiber at a distance at least as great as five times the radius of said fiber optic core of said side-hole optical fiber.

24. The method of claim 16, wherein said photodetector captures pressure and temperature information transmitted by repeated interference of light reflected from said first mirror, said second mirror, and said third mirror.

25. The method of claim 24, wherein pressure and temperature information are separated from said optical information through Fourier Transform (FT) processing by analytical non-discrete derivation methods.

26. The method of claim 24, wherein pressure and temperature information are separated from said optical information by template matching data against calibration reference points.

* * * * *